United States Patent
Stephenson et al.

(10) Patent No.: US 7,210,727 B2
(45) Date of Patent: May 1, 2007

(54) TRAILER ROOF BOW WITH CLINCHED END PIECES

(75) Inventors: Robert A. Stephenson, Chagrin Falls, OH (US); Chad M. England, Warsaw, IN (US); John C. Lokotar, Silver Lake, IN (US)

(73) Assignee: The Ohio Moulding Corporation, Wickliffe, OH (US)

( * ) Notice: Subject to any disclaimer, the term of this patent is extended or adjusted under 35 U.S.C. 154(b) by 123 days.

(21) Appl. No.: 11/123,310

(22) Filed: May 6, 2005

(65) Prior Publication Data

US 2006/0249977 A1    Nov. 9, 2006

(51) Int. Cl.
    *B62D 25/06*    (2006.01)
(52) U.S. Cl. ............... 296/104; 296/210; 296/203.03; 52/51
(58) Field of Classification Search ............... 296/104, 296/105, 185.1, 100.17, 100.18, 210, 203.01, 296/203.03, 213, FOR. 181, FOR. 183; 52/51
    See application file for complete search history.

(56) References Cited

U.S. PATENT DOCUMENTS

| | | | |
|---|---|---|---|
| 1,029,570 A | * | 6/1912 | Miller ............... 52/51 |
| 1,109,340 A | * | 9/1914 | Klohs ............... 52/51 |
| 1,161,498 A | * | 11/1915 | Mathews ............... 52/51 |
| 4,089,558 A | | 5/1978 | Banerjea et al. |
| 4,459,735 A | | 7/1984 | Sawdon |
| 4,660,882 A | | 4/1987 | Hensiek |
| 4,757,609 A | | 7/1988 | Sawdon |
| 5,000,507 A | | 3/1991 | Baxter |
| 5,681,076 A | * | 10/1997 | Yoshii ............... 296/210 |
| 6,962,389 B2 | * | 11/2005 | Katsuma ............... 296/187.12 |

* cited by examiner

*Primary Examiner*—Dennis H. Pedder
(74) *Attorney, Agent, or Firm*—Tarolli, Sundheim, Covell & Tummino LLP

(57) ABSTRACT

A roof bow adapted to support a roof skin of a trailer and be affixed to spaced apart top rails of the trailer. The roof bow includes an elongated channel and a pair of end pieces affixed to opposite ends of the elongated channel by clinching. When viewed in cross section transverse to its general extent, the channel includes a substantially flat central portion and extending end portions defining support surfaces offset vertically from the central portion. The support surfaces are adapted to support the trailer sheet skin. Each end piece includes a substantially flat flange and an angled arm extending away from the flange. The angled arm adapted to be affixed to a respective one of the trailer top rails. For each of the pair of end pieces, a plurality of clinch joints affix the flange to the central portion of the channel.

11 Claims, 9 Drawing Sheets

TRAILER ROOF BOW WITH CLINCHED END PIECES

FIELD OF THE INVENTION

The present invention relates to roof bows suitable for land vehicles such as trailers, vans and trucks and, more particularly, to a roof bow with clinched end pieces and a method of making such roof bows.

BACKGROUND OF THE INVENTION

Over-the-road land vehicles such as trailers, vans and trucks typically have a roof skin and side wall skins that are supported by metal frame structure. For brevity, as used herein, all such over-the-road land vehicles will be referred to as trailers. Specifically, the metal frame structure includes a plurality of side wall posts that support top rails that extend on opposite sides along an axial length of the trailer. At spaced apart intervals along the length of the trailer, a plurality of roof bows extend laterally between the top rails. The metal side wall skins are riveted to the side wall posts and the top rails. The roof skin is supported by the roof bows and riveted to the top rails. The roof skin is adhesively attached to the bows.

A roof bow typically includes an elongated channel with a pair of clips or end pieces affixed to opposite ends of the channel. The end pieces include a plurality of openings adapted to be fastened by rivets or other fasteners to aligned openings in the top rails.

Since the bows span the side rails it is important that the overall length of the bows be maintained within narrow tolerances in order to insure that the top rails run parallel along the axial length of the trailer. Because significant forces are applied to the roof bows when the trailer is loaded and driven over the road, it is important that the end pieces are securely affixed to the channel so that the bow is strong and durable. Finally, to minimize production costs, it is important that the fabrication process for affixing the end pieces to the channels be efficient.

Various methods have been used to fix end pieces to channels including welding, riveting and coining. Each method has its disadvantages. Welding is expensive because of the manual effort and skill level required for welding. Riveting also has a high cost because of the cost of the rivets and the cost associated with drilling or punching of aligned holes in the end pieces and the channel to accept the rivets. Coining involves punching holes in the channel end portion, extruding smaller diameter holes in an end piece, aligning the end piece extruded holes with the channel holes and coining out the end piece extruded holes to attach the end piece to the channel. While coining is less expensive than riveting or welding, it still requires holes to be punched in both the channel and the end piece. Additionally, extruding holes in the end piece tends to wear the end piece dies out rapidly.

What is needed is a method of manufacturing roof bows that is cost efficient, results in a strong and durable coupling between the end piece and the channel and consistent bow length between successive bows.

SUMMARY OF THE INVENTION

The present invention is directed to a roof bow adapted to support a roof skin of a trailer and be affixed to spaced apart top rails of the trailer. The roof bow is both durable and cost efficient to manufacture while maintaining close tolerances on the overall length of the roof bow.

The roof bow of the present invention includes an elongated channel and a pair of end pieces affixed to opposite ends of the channel by clinching. The channel, when viewed in cross section transverse to a general extent of the channel, includes a substantially flat central portion and extending end portions defining support surfaces offset vertically from the central portion. The support surfaces are adapted to support the trailer roof skin. Each end piece includes a substantially flat flange and an angled arm extending away from the flange. The angled arm is adapted to be affixed to a respective one of the trailer top rails. For each end piece, a plurality of clinch joints affixes the flange to the central portion of the channel.

In one preferred embodiment, the channel is hat-shaped in cross section and the offset support surfaces of the channel define a planar surface adapted to support the roof skin. For each end piece, a plurality of clinch joints affixes the flat flange of each end piece to the central portion of the channel. For each end piece, the angled arm includes one or more openings adapted to receive a rivet or other fastener to affix the end pieces to respective top rails of the trailer. In one embodiment, the end piece angled arms extend in a direction toward the channel end portion support surfaces. In an alternate embodiment, the end piece angled arms extend in a direction away from the channel end portion support surfaces.

The present invention is also directed to a method of fabricating a roof bow adapted to support a roof skin of a trailer and be affixed to spaced apart top rails of the trailer. The steps of the method include:

a) forming piece of metal into an elongated channel, the channel being formed such that, when viewed in cross section transverse to a general extent of the channel, the channel includes a substantially flat central portion and extending end portions defining support surfaces offset vertically from the central portion, the support surfaces adapted to support the trailer sheet metal roof skin;

b) providing a pair of end pieces adapted to be affixed to opposite ends of the channel, each end piece including a substantially flat flange and an angled arm extending away from the flange, the angled arm adapted to be affixed to a respective one of the trailer top rails; and c) affixing each end piece to a respective end of the channel by clinching the flange of each end piece to the central portion of the channel by forming a plurality of clinch joints to secure the end piece to the channel.

The present invention is also directed to an apparatus for fabricating a roof bow adapted to support a roof skin of a trailer and be affixed to spaced apart top rails of the trailer, the roof bow including an elongated channel and first and second end pieces adapted to be affixed to opposite ends of the elongated channel. The apparatus includes:

a) a left side locating nest for supporting a left side of the elongated channel and the first end piece, a flange portion of the first end piece positioned in alignment with a left end portion of the elongated channel;

b) a right side locating nest for supporting a right side of the elongated channel and the second end piece, a flange portion of the second end piece positioned in alignment with a right end portion of the elongated channel;

c) a left side clinching press actuatable to contact the aligned first end piece flange and the elongated channel left end portion and form a plurality of clinch joints to mechanically fasten the first end piece to the elongated channel;

d) a right side clinching press actuatable to contact the aligned second end piece flange and the elongated channel right end portion and form a plurality of clinch joints to mechanically fasten the second end piece to the elongated channel; and e) the left side locating nest including a locating plate having a locating surface adapted to bear against the first end piece and the right side locating nest including a locating plate having a locating surface adapted to bear against the second end piece, a distance between the locating surfaces of the left and right side locating nests substantially equal to a desired length of the roof bow.

These and other objects, advantages, and features of the exemplary embodiment of the invention are described in detail in conjunction with the accompanying drawings.

DETAILED DESCRIPTION

Figure 1:
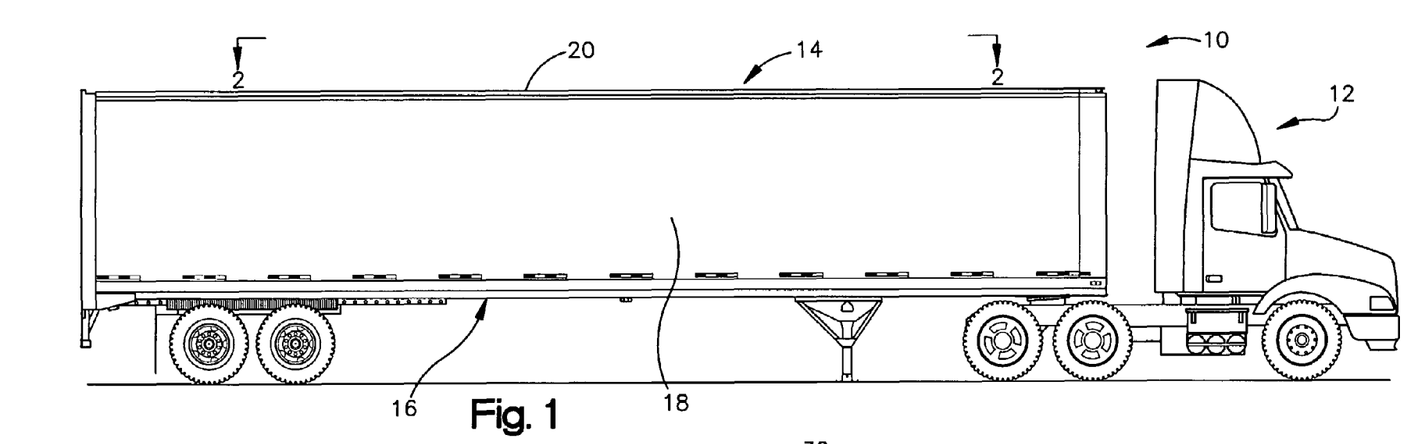
FIG. 1 is a side elevation view of a trailer including the roof bow of the present invention.
Figure 2:
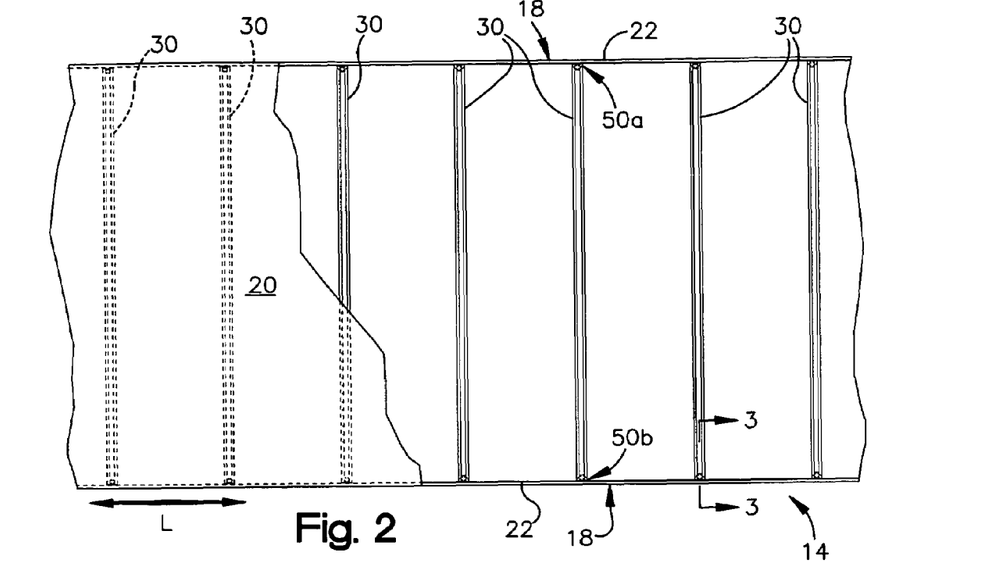
FIG. 2 is a top view, partly in plan and partly in elevation, of the trailer of FIG. 1 as seen from a plane indicated by the line 2—2 in FIG. 1.
Figure 3:
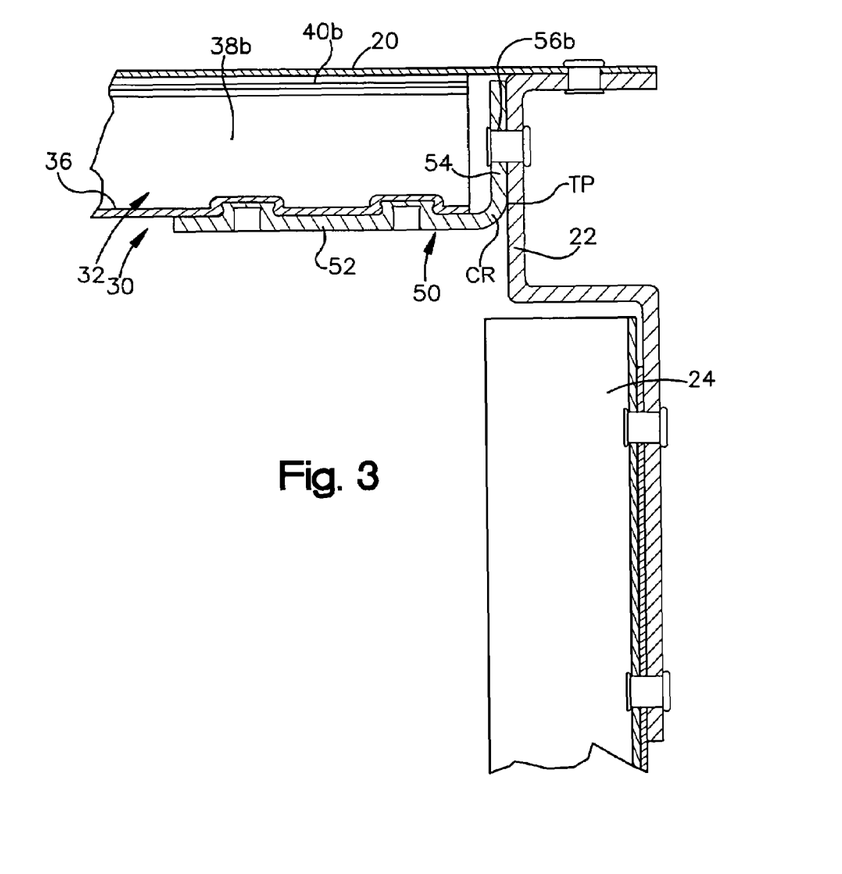
FIG. 3 is a sectional view of an upper portion of trailer showing the attachment of the roof bow of the present invention to a top side rail.
Figure 4:
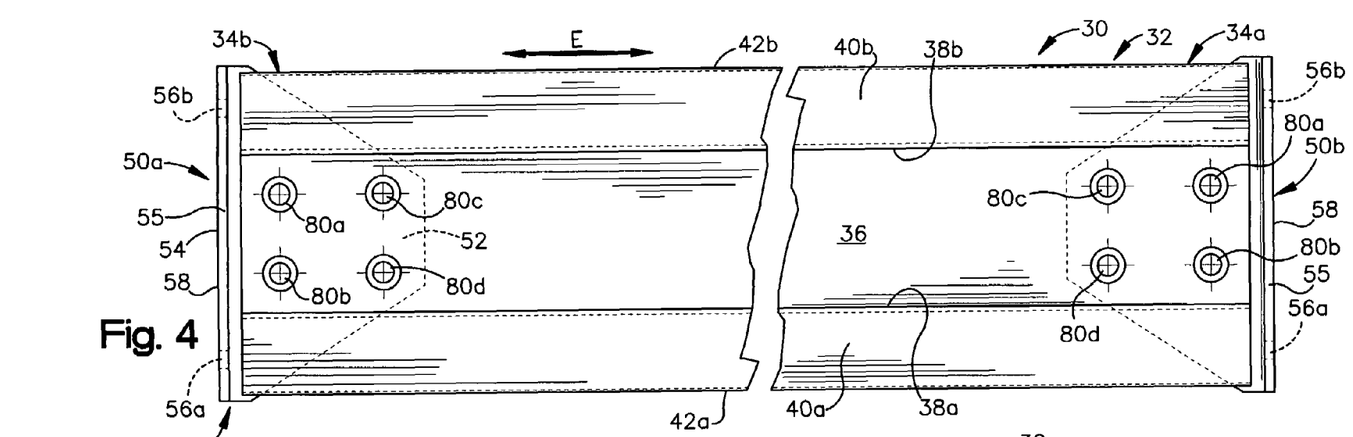
FIG. 4 is a top plan view of a first embodiment of the roof bow of the present invention (clip-up configuration)
Figures 5, 6:
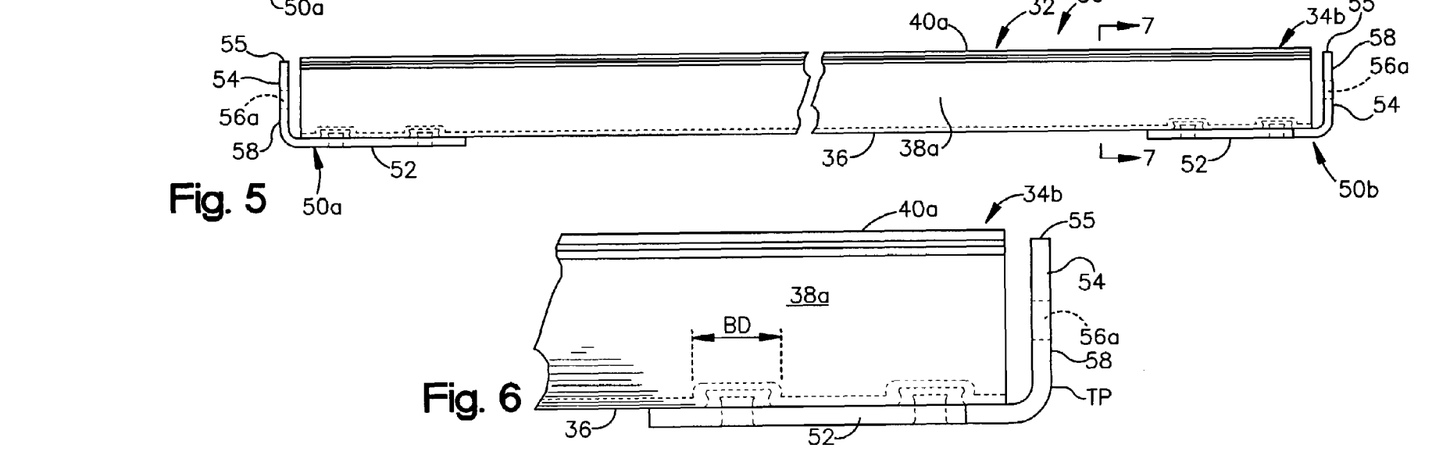
FIG. 5 is a front elevation view of the roof bow of FIG. 4 showing an upward bowing of a channel of the roof bow when installed.
FIG. 6 is an enlarged elevation view an end portion of the roof bow of FIG. 4.

Referring to the drawings, FIG. 1 shows an over-the-road tractor trailer at 10. A tractor 12 is hitched to and pulls a trailer 14. The trailer 14 comprises a support frame 16 that supports a bed of the trailer, thin side wall skins 18 of the trailer, and a thin roof skin 20 of the trailer. The side wall and roof skins 18, 20 may be fabricated of sheet metal or composite materials. Turning to FIGS. 2 and 3, the trailer roof skin 20 is affixed, typically with rivets to spaced apart parallel top rails 22 that in a longitudinal direction L along a length of the trailer. The parallel top rails 22 are, in turn, supported by and affixed to upright side posts 24 which are positioned at spaced intervals along the side of the trailer. In addition to supporting the top rails 22, the side posts 24 also support the side wall skins 18 which are riveted to the posts 24.

Figures 11, 12:
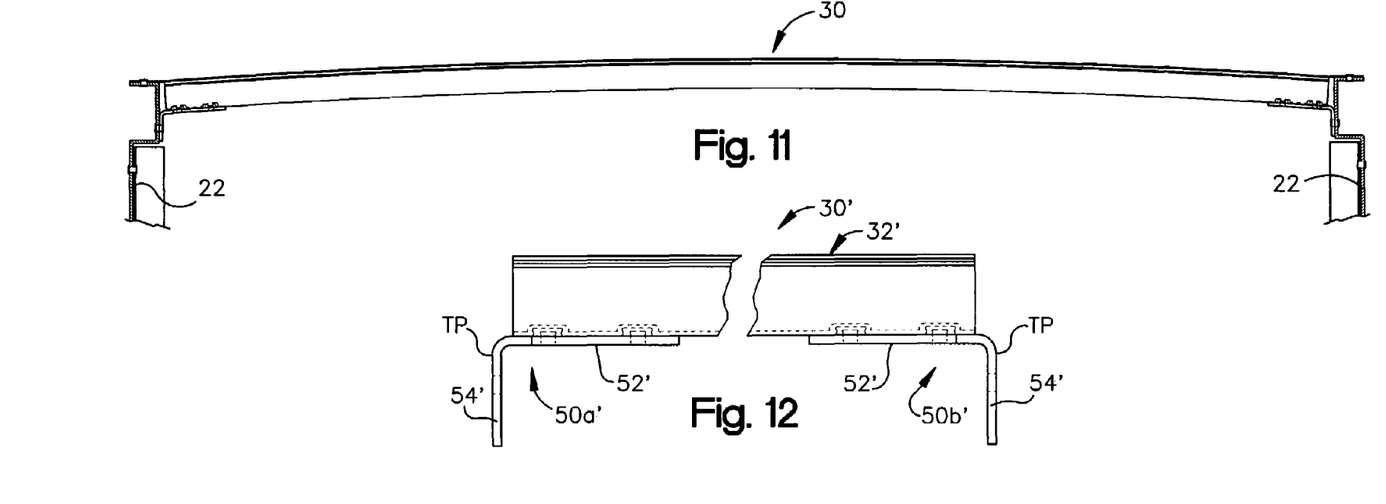
FIG. 11 is a front elevation view of an alternate embodiment of a roof bow of the present invention (clip-down configuration)
FIG. 12 is an enlarged front elevation view of an end portion of the roof bow of FIG. 11.

As can be seen, the roof skin 20 extends between or spans the top rails 22. Providing support for the roof skin 20 between the top rails are a plurality of spaced apart row bows 30 of the present invention. The roof bows 30 are relatively stiff and extend transversely between the top rails 22. The roof bows 30 are affixed to the top rails 22, typically by riveting. As seen in FIG. 11, when installed, the roof bows 30 have a slight upward arc or convex shape (about 5/16"–3/4" from horizontal) which advantageously pre-tensions or puts the roof skin 20 in tension in the transverse direction to minimize roof fluttering. The roof skin 20 is affixed to the roof bows 30 adhesively, for example, by double sided adhesive tape.

Clip-Up Roof Bow Configuration

One exemplary embodiment of the roof bow 30 of the present invention is seen in FIGS. 4–7. This embodiment is referred to as a clip-up configuration. The roof bow 30 includes a central channel 32 and a pair of clips or end pieces 50a, 50b which are affixed to respective end portions 34a, 34b of the channel. The channel 32 when viewed transversely to a general extent E of its length, the channel is U-shaped and, more particularly, is hat-shaped in cross section. Preferably, the channel 32 is fabricated of 16 gauge metal, such as galvanized steel. Dimensions of the channel 32 will depend on the specific application, a typical height h (FIG. 7) of the channel is 1 1/16" and a typical width w of the channel 32 is approximately 3 3/4".

Figure 7:
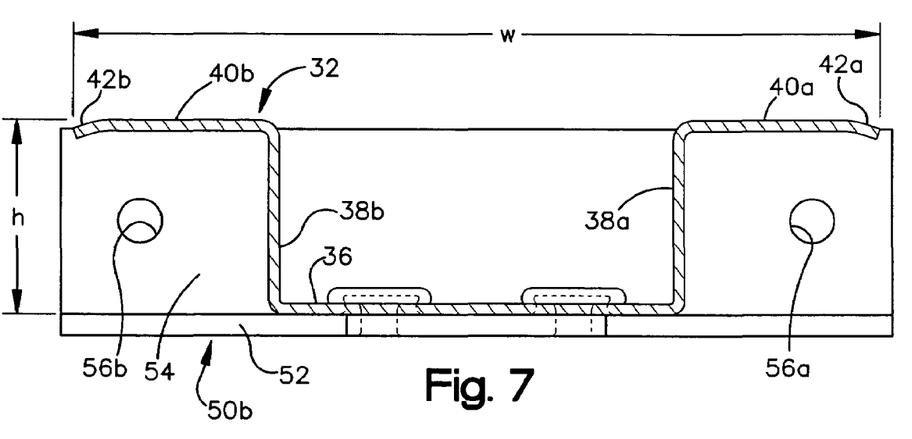
FIG. 7 is sectional view of the roof bow of FIG. 4 as seen from a plane indicated by the line 7—7 in FIG. 5.
Figure 8:
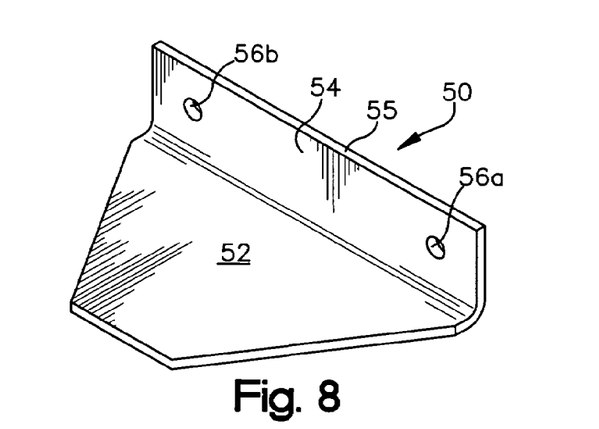
FIG. 8 is a top plan view of an end piece of the roof bow of FIG. 4.

The hat-shaped cross section provides rigidity and strength to the channel 32. The channel 32, viewed in section, includes a substantially flat central portion 36 and ribs 38a, 38b extending from the central portion 36. The ribs 38a, 38b support generally planar end portions 40a, 40b which are parallel and offset vertically from the central portion 36. The planar end portion 40a, 40b define support surfaces adapted to support the trailer sheet roof skin 20. The roof skin 20 is adhesively secured to the planar end portions 40a, 40b. Because the roof skin 20 flutters to a limited extent when the trailer 14 travels at speed along a road, distal edges 42a, 42b of the end portions are bent or angled downwardly to avoid abrasion or cutting of the roof skin 20.

Each of the two end pieces 50a, 50b is identical in configuration and will be discussed by referring to the end piece as 50. The end piece 50 includes a substantially flat flange 52 and an angled arm 54 extending upwardly away from the flange 52. Preferably, the end piece 50a, 50b is fabricated of 11 gauge metal such as galvanized steel. The end pieces 50a, 50b are thicker than the channel 32. The configuration shown in FIGS. 4–7 is referred to as the "clip-up" configuration because the arm 54 extends upwardly from the flange 52 and the channel central portion 36.

The angled arm 54 includes two spaced apart openings 56a, 56b which are adapted to be affixed to a respective one of the trailer upper top rails 22 via rivets though the openings 56a, 56b and aligned openings (not shown) in the top rails 22.

Figure 9:
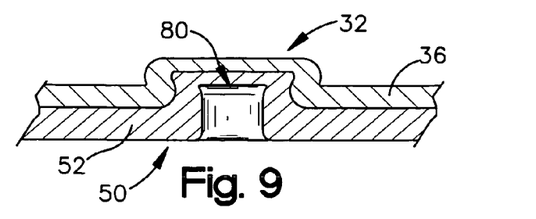
FIG. 9 is a schematic representation of a clinch joint formed to affix the end piece to the channel.

The end pieces 50a, 50b are affixed to the end portions 34a, 34b of the channel 32 by clinching. An enlarged view of a schematic representation of a clinch joint is shown in FIG. 9. Clinching involves a deformation of the metal to form a permanent joint between the flat central portion 36 of the channel 32 and flanges 52 of the respective end pieces 50a, 50b. The clinching process is performed by an assembly machine 100 of the present invention. The machine 100 includes a pair of press assemblies 160a, 160b, one for affixing the left side end piece 50a to the channel 32 and the other for affixing the right side end piece 50b to the channel 32. Since each press assembly 160a, 160b functions identically, for simplicity, the press assemblies will be referred to and described as press assembly 160. The press assembly 160 includes a punch assembly 170 and a die assembly 174.

Figure 10A:
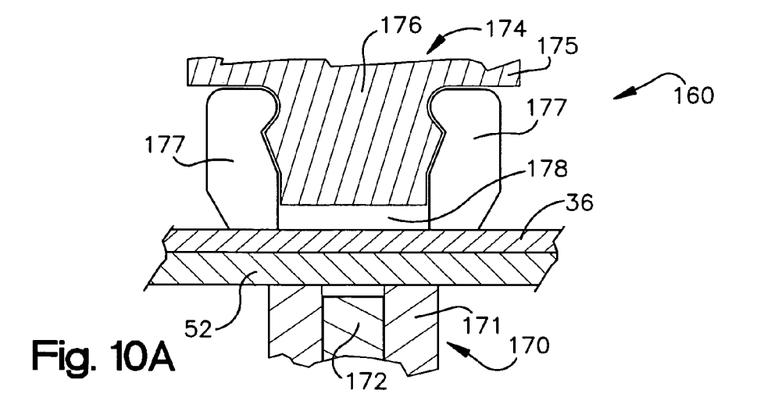
FIGS. 10A–10C are schematic representations of the clinch process used to form the clinch joint of FIG. 9.
Figure 10B:
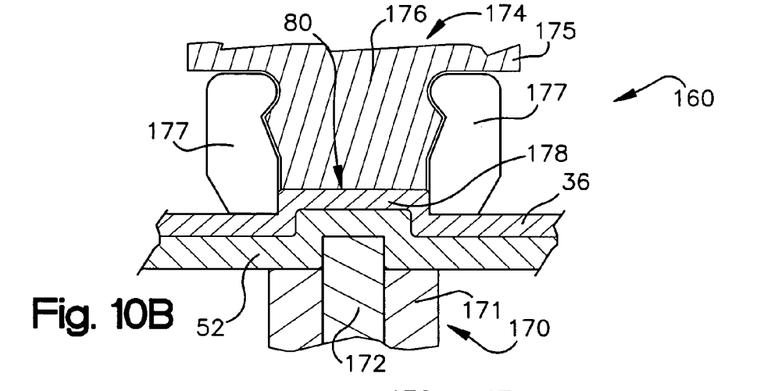
Figure 10C:
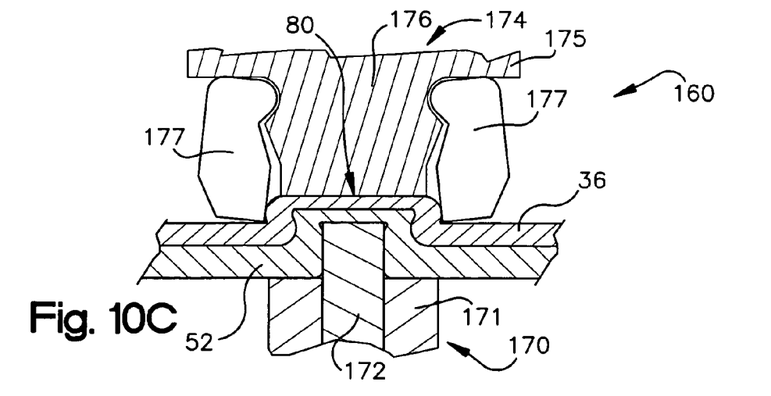

The clinching process is shown schematically in FIGS. 10A–C and involves drawing and subsequent lateral extrusion of the two metal pieces, channel central portion 36 and end piece flange 52. Advantageously, during the clinching process, there is no fracturing or shearing of the metal pieces 36, 52. Four clinch joints are formed between the end piece flange 52 and the channel central portion 36. To describe the formation of a clinch joint, only one joint will be described in detail. As can be seen in FIGS. 10A–C, the clinching press assembly 160 includes the punch assembly 170 and the die assembly 174. The punch assembly 170 includes a punch body 171 supporting a circular punch 172. The die assembly 174 includes a die body 175 which supports a hardened pin or anvil 176. Pivotally supported on each side of the die body 175 are die blades 177. The anvil 176 is recessed slightly from the upper surfaces of the die blades 177. The die blades 177 are biased to their closed positions (FIG. 10A) by a coil spring (not shown).

The punch body 171 is moved to abut an outer surface of the end piece flange 52. The flange 52 and channel central portion 36 are held firmly together. The punch 172 then travels upwardly striking the heavier gauge end piece flange 52 drawing the flange 52 and the lighter gauge channel central portion 36 into a cavity 178 formed by the recessed anvil 176 and the die portion 177. Stated another way, the punch 172 draws a cup shaped section of the flange 52 and channel central portion 36 into the die cavity 178.

The end piece flange 52 and channel central portion 36 deform under the pressure of the punch 172 and fill the cavity 178 partially forming a joint, as seen in FIG. 10B. As the punch 172 continues its upward movement toward the anvil 176, and reaches a distance from the anvil 176 that is less than the total combined thickness of the flange 52 and channel central portion 36, there is a lateral expansion or extrusion of the drawn portions of the flange 52 and channel central portion 36 occurs causing the partially formed joint 80 to expand outwardly. The further radial outward expansion or extrusion of the joint 80 is permitted by the outward pivoting of the die blades 177, as is shown in FIG. 10C. The flange 42 and channel central portion 36 are squeezed and flow outwardly. The die blades 177 pivot outwardly, allowing a secure interlocking of the flange 52 and channel central portion 36 to occur.

A schematic representation of a completed clinch joint is shown at 80 in FIG. 9. The drawing and extrusion of the materials 36, 52 between the punch 172 and the anvil 176 form a strong mechanical interlock of the materials without shearing or fracturing. A complete disclosure of the clinching process for joining metal sheet material is found in U.S. Pat. No. 4,757,609 to Sawdon, issued Jul. 19, 1988. The '609 patent is incorporated herein in its entirety by reference.

The diameter of the punch 172 will depend on the thickness and compositions of the channel and flange materials 36, 52. In one typical application with 16 gauge galvanized steel for the channel material 36 and an 11 gauge galvanized steel for the flange material 52, a ¼" diameter punch is used (¼" joint size) and the resulting button dimension (labeled BD in FIG. 7) is approximately 0.420"–0.425" in diameter.

Similarly, the number and spacing of the clinch joints will depend upon the materials used and the strength requirements of the joints as one of skill in the art would recognize. By way of example, in the application shown in the drawing figures, four clinch joints 80a, 80b, 80c, 80d are utilized to mechanically affix the end piece 50 to the channel 32 and are positioned in a square configuration in the region of overlap between the flange 52 and the channel central portion 36 (see FIG. 4). In one typical bow 30, centers of two of four clinch joints 80a, 80b are spaced inwardly from the outer edge 58 of the arm 54 by approximately 0.75 and the centers of other two clinch joints 80c, 80d are spaced from the centers of two clinch joints 80a, 80b an additional 1.25" inwardly. The centers of joints 80a and 80b and joints 80c and 80d are offset by approximately 0.94".

Clip-Down Roof Bow Configuration

An alternate embodiment of the roof bow of the present invention is shown generally at 30' in FIGS. 11 and 12. This embodiment if referred to as the "clip-down" embodiment because the arms 54' of the clips or end pieces 50a', 50b' extend downwardly from the respective flanges 52'. The end pieces 50a', 50b' are affixed to the central channel 32' via four clinch joints, just as in the first embodiment. Certain trailer manufacturers require the clip-down bow where the design of the trailer 14 does not provide access for riveting the bow to the top rails 22 from the outside of the trailer 14.

Fabrication of Roof Bow

Because roof bows 30 extend between the parallel trailer top rails 22, it is of paramount importance that the overall length of the roof bows be consistent so that the side walls 18 of the trailer 14 are parallel. The overall length of a roof bow is measured from a point of tangency or tangency point TP (shown in FIGS. 3, 12 and 15) of the opposite end pieces 50a, 50b. The tangency point TP of the end piece 50 is the outer surface point at which the arm 54 begins the transition from a straight portion to a curved portion CR (best seen in FIG. 3) extending between the arm 54 to the flange 52.

Depending on the particular trailer application and manufacturer, overall length of the bow will typically be one of three values, 92¾", 98¾", and 99¼". Each of these lengths may be fabricated in a clip-up or clip-down configuration. The end piece or clip dimensions will vary, among other things, on whether a clip-up or clip-down configuration is being fabricated. In the clip-up configuration, a length of the end piece arm 54 is shorter than the clip-down configuration to insure that an upper edge 55 of the arm is below the planar end portions 40a, 40b. The shortening of the arm 54 in the clip-up configuration prevents the arm upper edge 55 from contacting and potentially damaging the roof skin 20. By way of example, for the 98¾" length, the bow lengths are 98 3/16" for the clip-up configuration and 98 5/16" for the clip-down configuration The roof bow 20 of the present invention may be advantageously manufactured by the assembly and fabricating machine, shown generally at 100 in FIGS. 13–17. For simplicity, only portions of the machine 100 will be shown and discussed. Central channels 32 and end pieces 50, of appropriate size for the desired bow configuration and size are input to the machine 100. The machine 100 forms four clinch joints between each end piece 50 and the channel end portions 34a, 34b to fabricate a completed bow 30. Advantageously, the machine 100 includes the following features:

1) The central channel 32 is accurately centered with respect to the end pieces 50a, 50b.
2) The end pieces 50a, 50b are accurately positioned to provide the desired overall bow length extending between the tangency points TP of the end pieces 50a, 50b regardless of the length of the channel 32.
3) The end pieces 50a, 50b and channel 32 are joined in a clinching operation that generates four clinch joints 80 between each end piece and the channel.
4) The machine 100 accommodates fabrication of both clip-up and clip-down bow configurations.
5) A left side locating nest 102 and the left side clinching press assemblies 160a are slidably mounted on a horizontal way and movable between a predetermined number of positions corresponding to the number of desired overall bow lengths to permit fast changeover of the machine between runs of bows that have differing lengths without the need for time consuming adjustment of the locating nest and clinching press.

The machine 100 includes a frame or chassis 101 comprising a left side support 101a and a right side support 101b. The supports 101a, 101b include planar upper surfaces 101c, 101d. The supports 101a, 101b respectively supports the following components and assemblies: a left and right side locating nest 102, 104 which precisely positions the left and right end pieces 50a, 50b and the channel 32 prior to the clinching operation; left and right side clinching press assemblies 160a, 160b which form the clinch joints 80 to affix the end pieces 50a, 50b and the channel 32; and left and right side end piece feeding assemblies 130, 132 which feed the end pieces 50a, 50b into the locating nests 102, 104 in either a clip-up or clip-down orientation, as desired. Extending between the supports 101a, 101b is a ladder frame 101e which supports other components (not shown) of the press assemblies 160a, 160b including lubrication and pressure tanks.

The overall process of making a bow 20 is as follows. When the operator O removes a completed bow 30 from the machine 100, the operator uses the bow to hit an extending switch 152 to actuate the end piece feeding assemblies 130, 132. The assemblies 130, 132 feed end pieces 50a, 50b into the respective nests 102, 104. The operator O places the bow central channel 32 on top of the end piece flanges 52. Finally, the operator O, using a press actuation switch 154, actuates the press assemblies 160a, 160b to form the clinch joints 80 to complete the bow 30. The operator O removes the completed bow 30 from the machine 100 and trips the extending switch 152 to begin another cycle.

Figure 13:
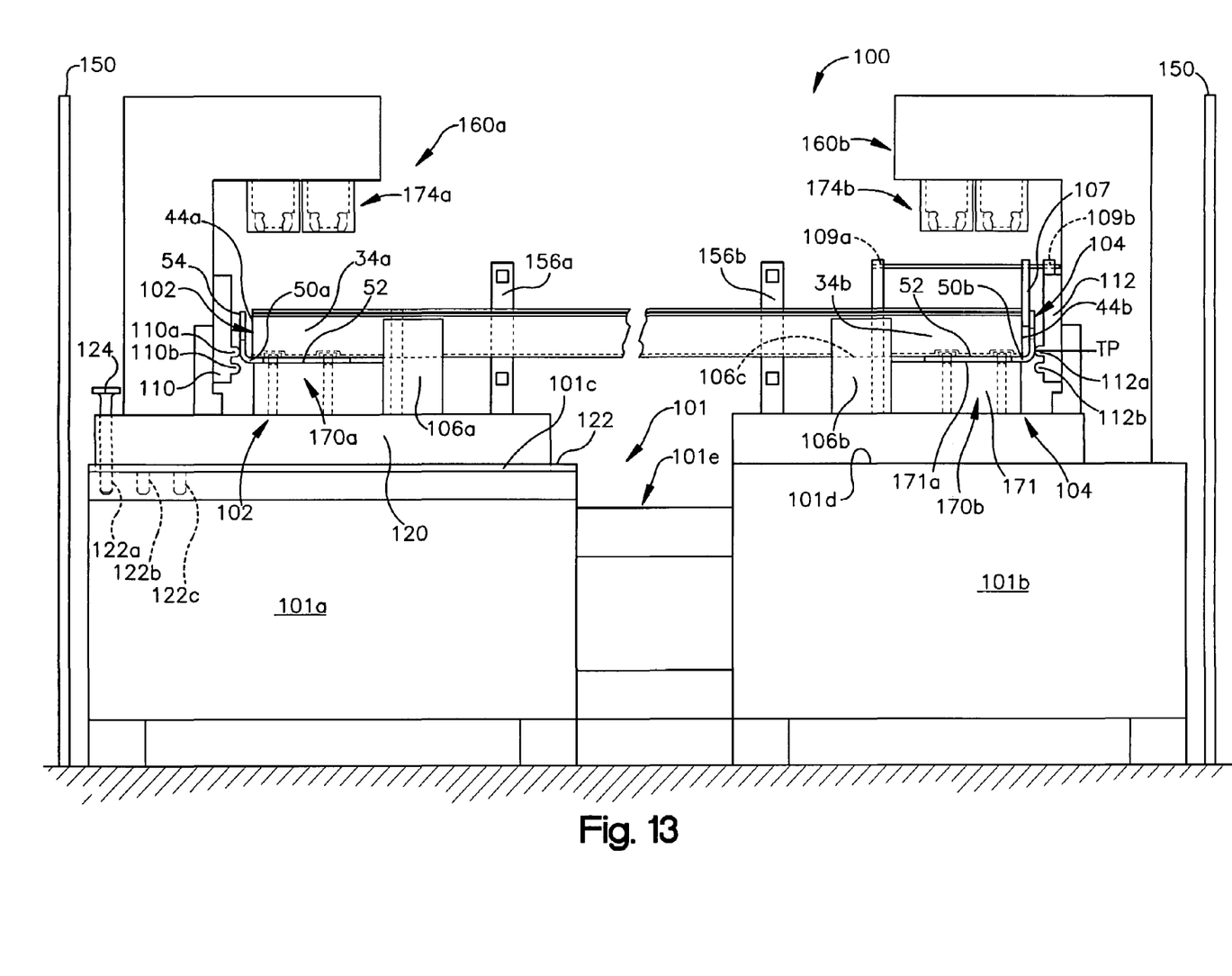
FIG. 13 is a schematic front elevation view of an assembly and fabrication machine of the present invention being used to fabricate the roof bow of FIG. 4 (clip-up configuration)
Figure 14:
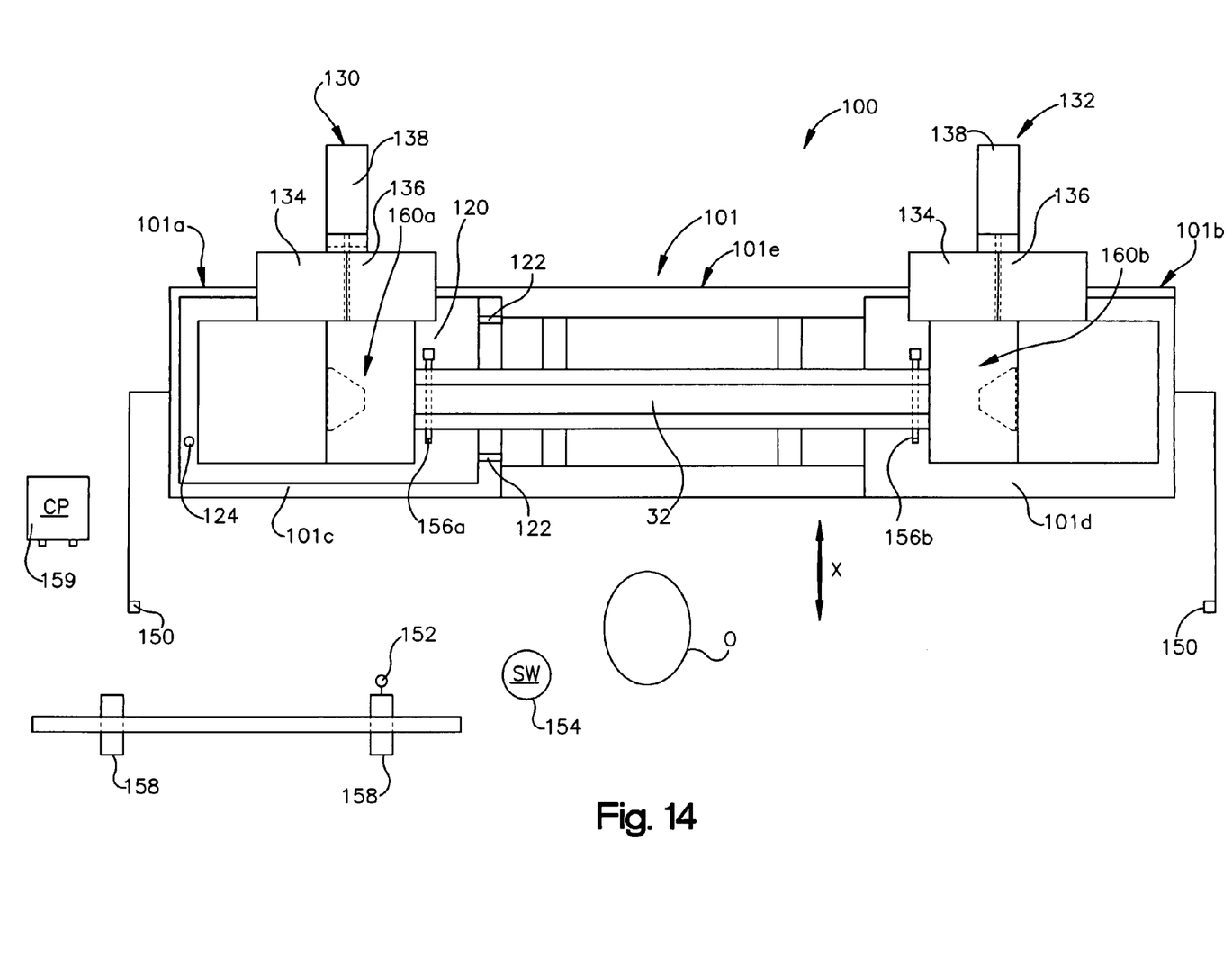
FIG. 14 is a schematic top plan view of the machine of FIG. 13.
Figure 15:
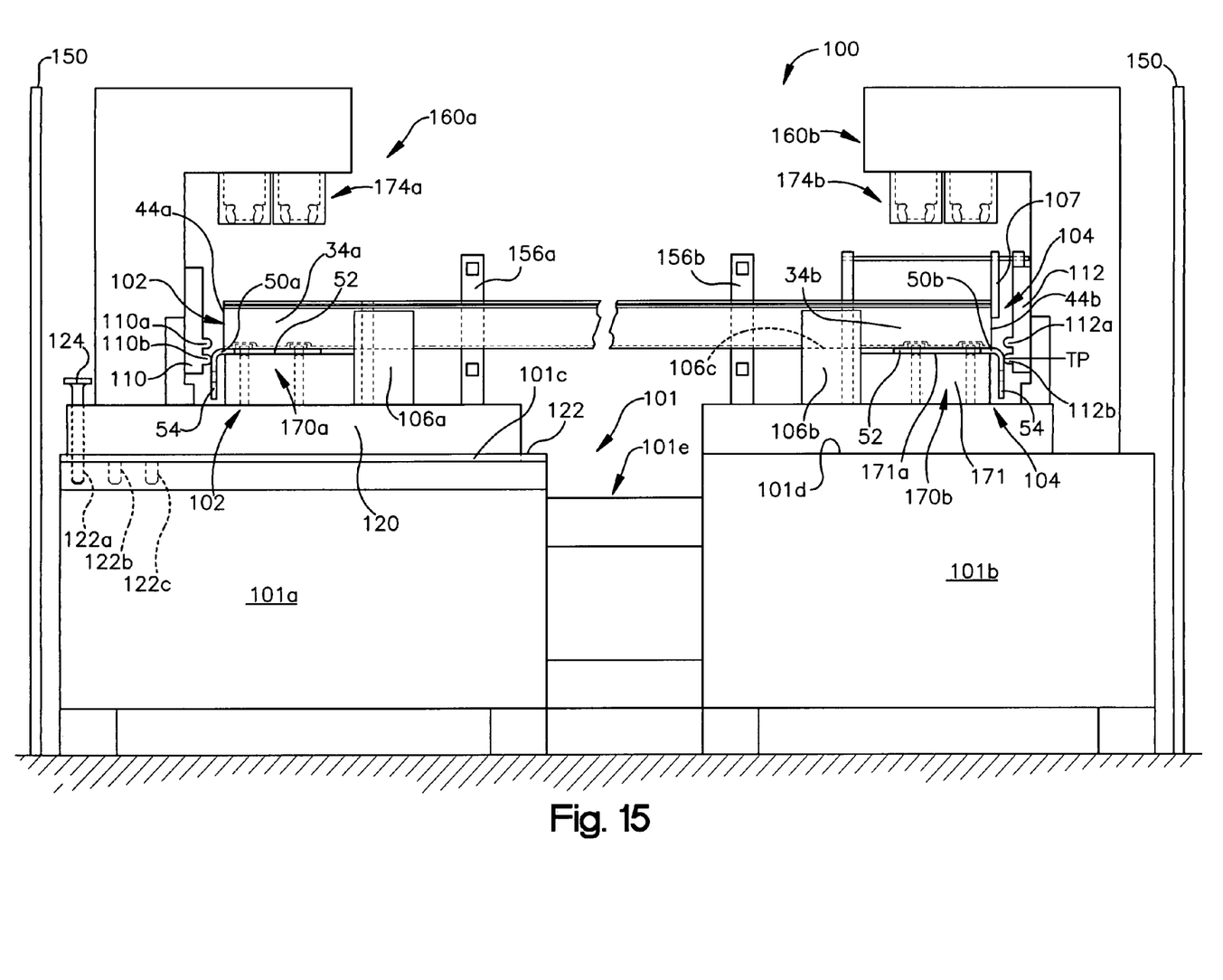
FIG. 15 is a schematic front elevation view of the machine of FIG. 13 being used to fabricate the roof bow of FIG. 11 (clip-down configuration)
Figure 16:
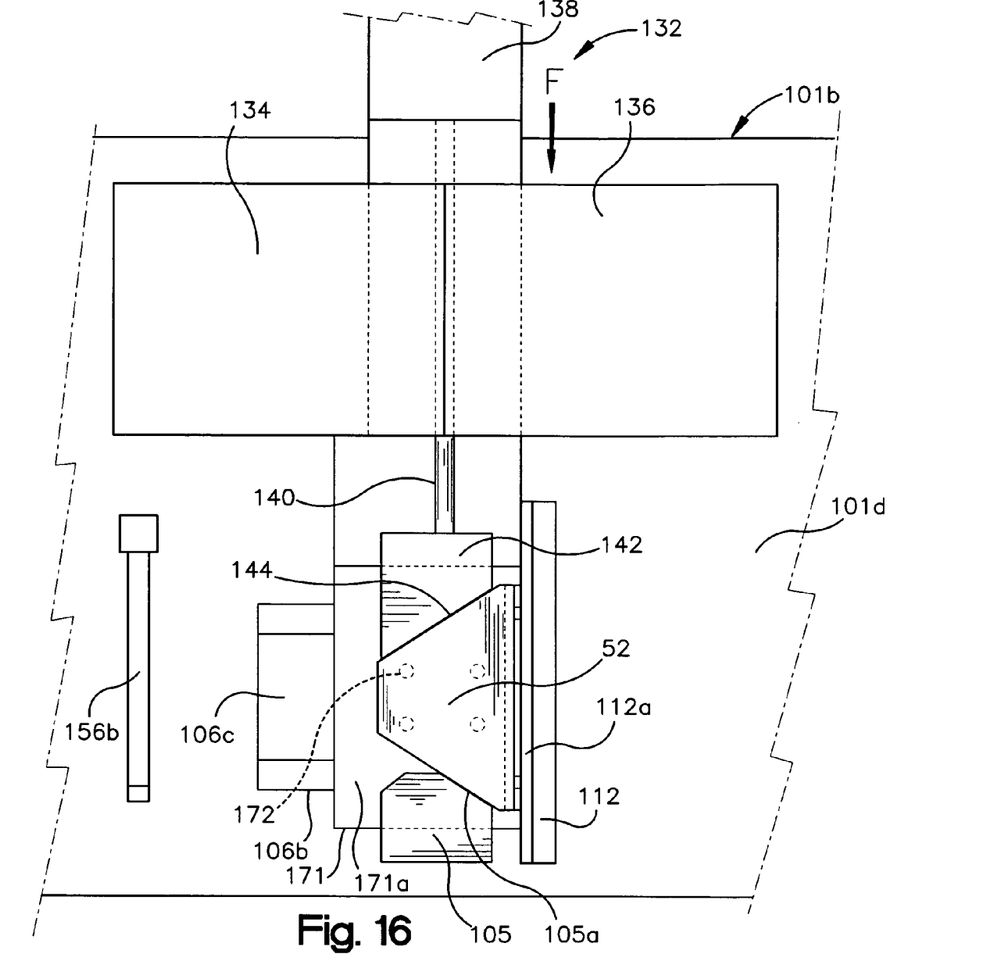
FIG. 16 is a schematic top plan view of a right side locating nest and end piece feeding assembly of the machine of FIG. 13.

The end piece feeding assemblies 130, 132 work in conjunction with the nests 102, 104 to accurately position the end pieces 50a, 50b such that the overall length of the bow 30 is accurately maintained at the desired length. The nest 102, 104 further accurately center the central channels 32 between the end pieces 50a, 50b. Each of the locating nests 102, 104 includes an end piece locating plate 110, 112. Each locating plate 110, 112 includes a pair of vertically aligned locating surfaces in the form of protuberances or buttons 110a, 110b, 112a, 112b. When the machine 100 is set up to fabricate a bow in the clip-up bow configuration, the end pieces 50a, 50b are fed by the respective feeding assemblies 130, 132 into the locating nests 102, 104 and held in place such that the tangency point TP of the left and right end pieces 50a, 50b bear against the respective upper locating buttons 110a, 112a (FIG. 13). When the machine 100 is set up to fabricate a bow in the clip-down bow configuration, the end pieces 50a, 50b are fed by the respective feeding assemblies 130, 132 into the locating nests 102, 104 and held in place such that the tangency point TP of the left and right end pieces 50a, 50b bear against the respective lower locating buttons 110b, 112b (FIG. 15).

Since the distance between the upper locating buttons 110a, 112a and between the lower locating buttons 110b, 112b is accurately set, the overall length of for every bow manufactured during a production run is completely consistent from bow to bow and conforms substantially exactly to the trailer manufacturer's desired overall bow length. The machine 100 of the present invention achieves this accuracy and consistency in spite of any tolerance errors in the dimensions of either the channel 32 or the end pieces 50a, 50b.

The end piece feeding assemblies 130, 132 feed end pieces 50a, 50b to respective locating fixtures or nests 102, 104 so that the end pieces are in proper orientation with respect to the channel 32 for the clinching operation. As the two feeding assemblies 130, 132 are identical, only the feeding assembly 132 will be explained with specific reference to FIGS. 16 and 17. The feeding assembly 132 includes a V-shaped pair of magazines 134, 136 holding a plurality of stacked end pieces and a piston 138 actuated to individually feed end pieces from a selected one of the magazines 134, 136 to the locating nest 104. One magazine 134 is used to store stacked end pieces in an orientation for clip-up installation of the end pieces and the other magazine 136 is used to store stacked end pieces in an orientation for clip-down installation of the end pieces. If a clip-up configuration is desired, end pieces from the magazine 134 are fed and the magazine 136 is blocked with a plate. On the other hand, if a clip-down configuration is desired, end pieces from the magazine 136 are fed and the magazine 134 is blocked with a plate.

The piston 138 includes a piston rod 140 and a pusher plate 142 attached to a distal end of the rod 142. When the piston 138 is actuated, the piston rod 140 moves forward (in the direction F in FIG. 16) and the pusher plate 142 contacts and moves a bottom end piece in the magazine 134 (assuming a clip-up configuration is being fabricated). Since the pusher plate 142 has an angled end 144 that matches the angle of the end piece flange 52, the end piece 50b is urged against the locating button 110a.

The locating nest 102 includes a stop 105 to stop forward travel of the end piece 50b. The stop 105 also has an angled edge 105a that matches the angle of the end piece flange 52. Thus, as the pusher plate 142 urges the end piece flange 52 against the edge 105a of the stop 105, the angles edges 144, 105a cause the end piece 50b to move to the right such that the end piece tangency point TP is firmly abutting the locating button 112a of the locating plate 112 and the end piece 50b is in correct position for the clinching operation.

The flange 52 of the end piece 50b rests on the flat upper support surface 171a of the punch body 171. The four punches 172 move upwardly through openings in the punch body 171 to strike the flange 52 during the clinching operation. The same configuration is used in connection with the left end piece feeding assembly 130 and the left locating nest 102 to move the end piece 50a into clinching position such that the end piece tangency point TP is firmly abutting the locating button 110a of the locating plate 110.

After the end pieces 50a, 50b are positioned in the locating nests 102, 104, the operator O positions a channel on top of the end piece flanges 52. The locating nests 102, 104 further include channel saddles 106a, 106b. The saddles 106a, 106b include a U-shaped opening 106c that receives the central portion 36 of the channel 32. The saddles 106a, 106b constrain the channel 32 from movement forwardly or rearwardly, that is, in the x direction (FIGS. 14 and 16), that is, toward or away from the operator O standing in front of the machine 100. The saddles 106a, 106b do not support the channel 32 as the channel end portions 34a, 34b rest on the flanges 52.

Figure 17:
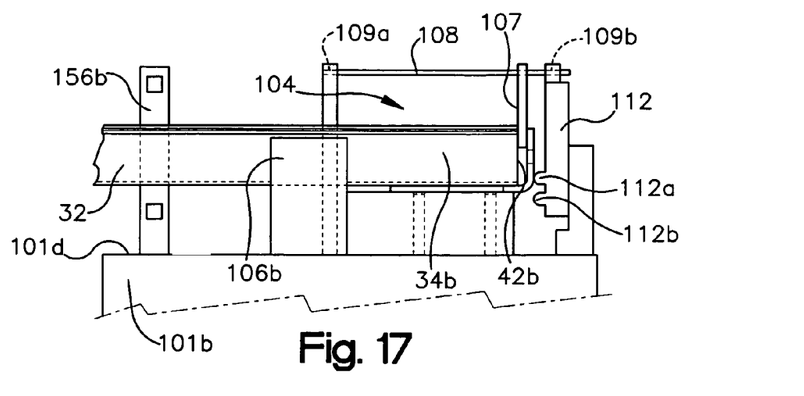
FIG. 17 is a schematic front elevation view of the right side locating nest of the machine of FIG. 13.

The right side nest 104 further includes vertically extending centering knife edge 107. The knife edge 107 is mounted on a rotatable shaft 108 which, in turn is rotatably mounted in bearings 109a, 109b. A cam mechanism (not shown) is provided such that when the right side piston rod 140 moves forward to advance an end piece from one of the magazines 134, 136 into the locating nest 104, the cam mechanism is moved to cause the shaft 108 to rotate and thereby pivot the knife edge 107 into position (as shown in FIG. 17). After the clinching operation is complete, when the piston rod 140 retracts, the cam mechanism is moved such that the shaft rotates in the opposite direction to pivot the knife edge 107 rearwardly such that is not in the way when the completed bow 30 is removed by the operator O.

When the operator O inserts a channel 32 into the machine 100, the central channel 32 is positioned in the U-shaped opening 106c of the saddles 106a, 106b. The operator O then slides the channel 32 to the right such that a right edge 44b of the channel 32 abuts the centering knife edge 107. The knife edge 107 centers the channel 32 with respect to the end pieces 50a, 50b and the overall length of the bow 30. Centering the channel 32 by abutting the knife edge 107 assumes the channel is of nominal or desired length. If the channel 32 is slightly under or over nominal length, the left hand edge 44a of the channel will be slightly closer to or spaced further from the arm 54 of the end piece 50a. However, assuming the channel 32 is within overall tolerance, a slight deviation of the left hand edge 44a will not affect the integrity of the clinch joints and equally importantly, will not change the overall desired length of the bow.

To guide the operator when inserting the channel 32 prior to clinching and when removing the completed bow 30 after clinching, two pairs of upper and lower horizontally extending guide bars 156a, 156b are provided. The guide bars 156a, 156b prevent the operator O from hitting the upper die assemblies 174a, 174 with the bow 30.

If it is desired to fabricate bows in a clip-down configuration, the feeding assemblies 108, 109 are reset to feed the end pieces 50a, 50b from the magazines 136. This results in end pieces being fed into the locating nests 102, 104 in the clip-down orientation such the tangency point TP of the left and right end pieces 50a, 50b bear against the respective lower locating buttons 110b, 112b. Since the distance between the locating buttons 110b, 112b is accurately set, as was the case with the clip-up configuration, the overall length of for every clip-down bow manufactured during a production run is completely consistent from bow to bow and conforms substantially exactly to the trailer manufacturer's desired overall bow length.

The machine 100 further includes a left side clinching press assembly 160a and a right side clinching press assembly 160b (FIG. 13). Each assembly 160a, 160b includes a punch assembly 170a, 170b positioned below the channel 32 with four punches and a die assembly 174a, 174b positioned above the channel with four dies. The punch assemblies and die assemblies 170a, 174a, 170b, 174b when actuated move vertically to contact the end piece flanges 52 and the channel central portion 36 to form the four clinch joints 80 between respective end pieces 50a, 50b and the channel end portions 34a, 34b. The operator O actuates the press assemblies 160a, 160b via an actuation switch 154 located at a safe distance from the press assemblies 160a, 160b to avoid risk of injury.

For additional operator safety, a light curtain 150 on either side of the machine chassis or frame 101 is utilized to prevent actuation of the clinching presses 60a, 60b unless the operator's hands are clear. A conveyor system 158 is provided adjacent a front of the machine 100 to facilitate loading of channels 32 and unloading of completed bows 30. A master control panel 159, including a visual display of production data, input keys and a master kill switch, is provided.

After the channel 32 has been centered against the knife edge 106 and end pieces 50a, 50b positioned by the locating buttons 110a, 112a (clip-up configuration) or 110b, 112b (clip-down configuration) to assure the overall length of the bow 30, the clinching punch assemblies 170 and die assemblies 174 located in vertical alignment with the left and right end piece flanges 52 are actuated to form the four clinch joints 80a, 80b, 80c, 80d in each end piece flange 52. Upon retraction of the clinching punch and die assemblies 170, 174, the completed bow 30 is removed by the operator O and a new channel 32 is inserted.

Advantageously, to permit the machine 100 to fabricate bows that have differing overall lengths, the left side of press assembly 170a and left locating nest 102 are mounted on a carriage 120 that moves horizontally. The carriage 120 is slidably mounted on a pair of horizontal ways or rails 122. The ways 122 are mounted to the planar upper surface 101c of the left side support 101a.

The horizontal movement of the carriage 120 permits the machine 100 to fabricate differing length bows. Advantageously, the carriage 120 can moved to different predetermined positions corresponding to the different overall bow lengths. The carriage 120 includes an opening 120a and the left side support 101a includes a predetermined number of openings 122a, 122b, 122c, one for each desired bow length. For example, when the carriage opening 120a is aligned with opening 122c, the distance between the locating buttons 110a and 112a (and between locating buttons 110b and 112b) is 92 3/16" resulting in an overall bow length of 92 3/16". When the two carriage opening 120a and one of the openings 122a, 122b, 122c are aligned, the machine 100 is set to fabricate a run of one of the desired bow lengths. The carriage 120 is held in one of the predetermined positions by a dowel pin 124 which extends through the aligned openings of the carriage 120 and the support 101a. When a run of bows is completed and a new length bow is desired, the carriage 120 is moved appropriately to the proper predetermined position corresponding to the desired bow length.

While the present invention has been described with a degree of particularity, it is the intent that the invention includes all modifications and alterations from the disclosed design falling with the spirit or scope of the appended claims.

We claim:

1. A roof bow adapted to support a roof skin of a trailer and be affixed to spaced apart top rails of the trailer, the roof bow comprising:

a) an elongated channel having a general extent and, when viewed in cross section transverse to the general extent of the channel, including a substantially flat central portion and extending end portions defining substantially planar support surfaces offset vertically from the central portion, the substantially planar support surfaces for supporting the trailer roof skin;

b) a pair of end pieces affixed to opposite ends of the elongated channel, each end piece including a substantially flat flange and an angled arm extending away from the flange, the angled arm for affixing to a respective one of the trailer top rails; and c) for each of the pair of end pieces, a plurality of clinch joints affix the flange to the central portion of the channel and an area of contact between the end piece and the channel is limited to the flange and the central portion of the channel.

2. The roof bow of claim 1 wherein the elongated channel is hat shaped in cross section.

3. The roof bow of claim 1 wherein the extending end portions of the elongated channel include edges which are angled downwardly such that the edges are spaced from the trailer roof skin when the roof bow is installed.

4. The roof bow of claim 1 wherein four clinch joints affix each end piece to the central portion of the channel.

5. The roof bow of claim 1 wherein the elongated channel and the end pieces are formed of galvanized steel.

6. The roof bow of claim 1 wherein the angled arms of the respective end pieces extend upwardly from the elongated channel central portion in a direction toward the extending end portions.

7. The roof bow of claim 1 wherein the angled arms of the respective end pieces extend downwardly from the elongated channel central portion in a direction away from the extending end portions.

8. A method of fabricating a roof bow adapted to support a roof skin of a trailer and be affixed to spaced apart top rails of the trailer, the steps of the method comprising:

a) providing an elongated channel formed such that, when viewed in cross section transverse to a general extent of the channel, the elongated channel includes a substantially flat central portion and extending end portions defining substantially planar support surfaces offset vertically from the central portion, the substantially planar support surfaces for supporting the trailer roof skin;

b) aligning and affixing a pair of end pieces to opposite ends of the channel, each end piece including a substantially flat flange and an angled arm extending away from the flange, the angled arm for affixing to a respective one of the trailer top rails; and c) affixing each end piece to a respective end of the channel by forming a plurality of clinch joints between the flange of each end piece and the central portion of the channel wherein an area of contact between the end piece and the channel is limited to the flange and the central portion of the channel.

9. The method of fabricating a roof bow of claim 8 wherein step c) includes forming four clinch joints between the flange of each end piece and the central portion of the channel.

10. The roof bow of claim 1 wherein an upper edge of each of the angled arms is below the planar support surfaces of the channel extending end portions.

11. A roof bow adapted to support a roof skin of a trailer and be affixed to spaced apart top rails of the trailer, the roof bow comprising:

a) an elongated channel having a general extent and, when viewed in cross section transverse to the general extent of the channel, including a substantially flat central portion and extending end portions defining substantially planar support surfaces offset vertically from the central portion, the planar support surfaces for supporting the trailer roof skin;

b) a pair of end pieces affixed to opposite ends of the elongated channel, each end piece including a substantially flat flange and an angled arm extending away from the flange, the angled arm for affixing to a respective one of the trailer top rails;

c) for each of the pair of end pieces, a plurality of clinch joints affix the flange to the central portion of the channel and an area of contact between the end piece and the channel is limited to the flange and the central portion of the channel; and d) the angled arms of the respective end pieces extend upwardly from the elongated channel central portion in a direction toward the extending end portions, an upper edge of each of the angled arms being below the planar support surfaces of the channel extending end portions.

* * * * *